(12) United States Patent
Mori et al.

(10) Patent No.: US 10,569,646 B2
(45) Date of Patent: Feb. 25, 2020

(54) FUEL CELL VEHICLE

(71) Applicant: TOYOTA JIDOSHA KABUSHIKI KAISHA, Toyota-shi (JP)

(72) Inventors: Nobuhito Mori, Nisshin (JP); Masanori Miyakawa, Yamato (JP); Keijiro Ohshima, Toyota (JP); Daiki Nishiumi, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 107 days.

(21) Appl. No.: 15/874,296

(22) Filed: Jan. 18, 2018

(65) Prior Publication Data

US 2018/0201125 A1    Jul. 19, 2018

(30) Foreign Application Priority Data

Jan. 19, 2017   (JP) .................................. 2017-007337

(51) Int. Cl.
   *B60K 15/063*    (2006.01)
   *H01M 8/04082*   (2016.01)
   (Continued)

(52) U.S. Cl.
   CPC ............. *B60K 15/063* (2013.01); *B60K 1/00* (2013.01); *B60K 1/04* (2013.01); *B60L 3/0007* (2013.01);
   (Continued)

(58) Field of Classification Search
   CPC ........... B60K 2015/03315; B60K 2015/03118; B60K 2015/0634; B60K 15/063; B60K 1/00; B60K 1/04; B60L 50/71; B60L 50/72; B60L 3/0007; B60L 3/0015; B60L 3/0053; H01M 2250/20; H01M 8/04201; Y02T 90/32; Y02T 90/34; B60Y 2306/01; F17C 2270/0184
   See application file for complete search history.

(56) References Cited

U.S. PATENT DOCUMENTS 6,874,588 B2 *  4/2005  Kato ....................... B60K 1/04
                                                    429/413
6,994,178 B2 *  2/2006  Mizuno ................... B60K 1/04
                                                    429/430
(Continued)

FOREIGN PATENT DOCUMENTS

JP    2012-175853 A    9/2012
JP    2014-213817 A    11/2014
(Continued)

*Primary Examiner* — Laura Freedman
(74) *Attorney, Agent, or Firm* — Oblon, McClelland, Maier & Neustadt, L.L.P.

(57) ABSTRACT

A fuel cell vehicle includes tanks configured to store a fuel gas to be supplied to the fuel cell, the tanks being respectively disposed in front of and behind the motor drive unit such that a longitudinal direction of each of the tanks corresponds to a width direction of the fuel cell vehicle. The tanks are disposed such that respective end portions of the tanks on a side on which the high-voltage wiring portion is positioned are outside the high-voltage wiring portion in the width direction of the fuel cell vehicle and the respective end portions of tanks overlap a tire-wheel assembly in a front-rear direction of the fuel cell vehicle.

2 Claims, 2 Drawing Sheets

(51) Int. Cl.
  *B60K 1/04*   (2019.01)
  *B60K 1/00*   (2006.01)
  *B60L 50/71*  (2019.01)
  *B60L 50/72*  (2019.01)
  *B60L 3/00*   (2019.01)
  *B60K 15/03*  (2006.01)

(52) U.S. Cl.
  CPC ........... *B60L 3/0015* (2013.01); *B60L 3/0053* (2013.01); *B60L 50/71* (2019.02); *B60L 50/72* (2019.02); *H01M 8/04201* (2013.01); *B60K 2015/03315* (2013.01); *B60K 2015/0634* (2013.01); *B60Y 2306/01* (2013.01); *H01M 2250/20* (2013.01); *Y02T 90/32* (2013.01)

(56) References Cited

U.S. PATENT DOCUMENTS

| | | | | |
|---|---|---|---|---|
| 7,040,432 B2* | 5/2006 | Kawasaki | ............. | B60K 15/01 |
| | | | | 180/65.1 |
| 7,270,899 B2* | 9/2007 | Kato | ........................ | B60K 1/04 |
| | | | | 429/413 |
| 7,703,564 B2* | 4/2010 | Kondo | ................... | B60K 1/00 |
| | | | | 180/65.1 |
| 7,926,601 B2* | 4/2011 | Ono | ...................... | B60K 15/063 |
| | | | | 180/68.5 |
| 8,083,263 B2* | 12/2011 | Yamanami | ............. | B60K 15/07 |
| | | | | 280/830 |
| 8,459,399 B2* | 6/2013 | Ohashi | ................... | B60K 1/04 |
| | | | | 180/312 |
| 8,480,131 B2* | 7/2013 | Schultheis | ............. | B60K 15/07 |
| | | | | 280/830 |
| 8,607,909 B2* | 12/2013 | Ohashi | ................... | B60K 1/04 |
| | | | | 180/68.5 |
| 8,672,359 B2* | 3/2014 | Ohashi | ................... | B60K 1/04 |
| | | | | 180/69.4 |
| 8,944,469 B2* | 2/2015 | Mulanon | ............... | F17C 13/084 |
| | | | | 280/834 |
| 8,960,360 B2* | 2/2015 | Sangha | ................. | B60K 13/06 |
| | | | | 180/309 |
| 9,162,559 B2* | 10/2015 | Arisawa | ................. | B60K 1/04 |
| 9,199,550 B2* | 12/2015 | Katano | ................... | B60L 50/72 |
| 9,283,838 B2* | 3/2016 | Ohashi | ................... | B60K 1/04 |
| 9,290,091 B2* | 3/2016 | Lee | ........................ | B60K 15/07 |
| 9,537,159 B2* | 1/2017 | Jufuku | .................. | B60K 1/04 |
| 10,076,956 B2* | 9/2018 | Ohashi | ................... | B60K 15/07 |
| 10,081,242 B2* | 9/2018 | Okawachi | ............... | B60L 50/71 |
| 10,100,711 B2* | 10/2018 | Mori | ........................ | F01P 11/08 |
| 10,300,788 B2* | 5/2019 | Nishiumi | ............. | B60K 15/067 |
| 2005/0139402 A1* | 6/2005 | Yamashita | ............... | B60K 1/04 |
| | | | | 429/413 |
| 2010/0003576 A1* | 1/2010 | Tamura | ............. | H01M 8/04104 |
| | | | | 429/418 |
| 2016/0137098 A1* | 5/2016 | Katano | ................ | B60L 11/1887 |
| | | | | 307/10.1 |
| 2017/0120738 A1 | 5/2017 | Landgraf et al. | | |
| 2019/0039446 A1* | 2/2019 | Koike | ..................... | B60K 1/04 |

FOREIGN PATENT DOCUMENTS

| | | |
|---|---|---|
| JP | 2017-7549 A | 1/2017 |
| WO | WO 2015/185184 A1 | 12/2015 |

* cited by examiner

FUEL CELL VEHICLE

INCORPORATION BY REFERENCE

The disclosure of Japanese Patent Application No. 2017-007337 filed on Jan. 19, 2017 including the specification, drawings and abstract is incorporated herein by reference in its entirety.

BACKGROUND

1. Technical Field

The present disclosure relates to a fuel cell vehicle.

2. Description of Related Art

Fuel cell vehicles traveling by using a motor that is driven by the electric power which is generated by a fuel cell being used are known. Certain fuel cell vehicles are provided with a motor drive unit in which a motor and a mechanism transmitting the drive force of the motor to a vehicle wheel axle are accommodated in a case and a plurality of tanks storing a fuel gas to be supplied to a fuel cell (refer to, for example, WO 2015/185184).

In the fuel cell vehicle that is disclosed in WO 2015/185184, the motor drive unit is mounted in the rear portion of the vehicle and the tanks are disposed in front of and behind the motor drive unit such that the longitudinal direction of each of the tanks corresponds to the width direction of the vehicle.

SUMMARY

In a fuel cell vehicle that is provided with a motor drive unit which is provided with a high-voltage wiring portion on one side, the rear wheel (tire-wheel assembly) that is on the side of the motor drive unit on which the high-voltage wiring portion is positioned may be pushed into the motor drive unit during a side collision of the fuel cell vehicle. Then, damage to the high-voltage wiring portion may result from the impact of the collision of the rear wheel and contact of the rear wheel with high-voltage wiring may eventually occur.

The disclosure provides a fuel cell vehicle with a structure with which a high-voltage wiring portion can be protected with a higher level of reliability from a side collision during the side collision of the fuel cell vehicle that is provided with a motor drive unit which has the high-voltage wiring portion on one side of the motor drive unit.

An aspect relates to a fuel cell vehicle including a motor drive unit, a high-voltage wiring portion and tanks. The motor drive unit includes a motor driven by electric power generated by a fuel cell, a mechanism transmitting a drive force of the motor to a vehicle wheel axle, the vehicle wheel axle extending in a width direction of the fuel cell vehicle, and a case accommodating the motor and the mechanism, the motor drive unit being disposed over the vehicle wheel axle. A high-voltage wiring portion is disposed on one side of the motor drive unit. The tanks are configured to store a fuel gas to be supplied to the fuel cell, the tanks are respectively disposed in front of and behind the motor drive unit such that a longitudinal direction of each of the tanks corresponds to the width direction of the fuel cell vehicle. The tanks are disposed such that respective end portions of the tanks on a side on which the high-voltage wiring portion is positioned, the respective end portions being outside the high-voltage wiring portion in the width direction of the fuel cell vehicle, and the respective end portions of the tanks overlap a tire-wheel assembly in a front-rear direction of the fuel cell vehicle.

With the fuel cell vehicle according to the aspect, even when the tire-wheel assembly that is on the side on which the high-voltage wiring portion is positioned is pushed into the motor drive unit during a side collision of the fuel cell vehicle, the tire-wheel assembly hits the tanks first, and thus the impact of the collision can be received by the tanks first. As a result, the high-voltage wiring portion can be protected with a higher level of reliability from the side collision and damage to the high-voltage wiring portion can be avoided.

In the fuel cell vehicle according to the aspect, the tire-wheel assembly may have a wheel and a tire mounted on an outer periphery of the wheel and the tanks in front of and behind the motor drive unit may be disposed such that each of the tanks overlaps the wheel of the tire-wheel assembly on the side on which the high-voltage wiring portion in the front-rear direction of the fuel cell vehicle. According to the configuration described above, the wheel of the tire-wheel assembly hits the tanks first during the side collision. By the wheel of the tire-wheel assembly being received by the tanks as described above, the high-voltage wiring portion can be protected with a higher level of reliability.

The high-voltage wiring portion can be protected with a higher level of reliability from the side collision during the side collision of the fuel cell vehicle according to the above configuration that is provided with the motor drive unit which provides with the high-voltage wiring portion on the side of the motor drive unit.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment will be described with reference to accompanying drawings.

Figure 1:
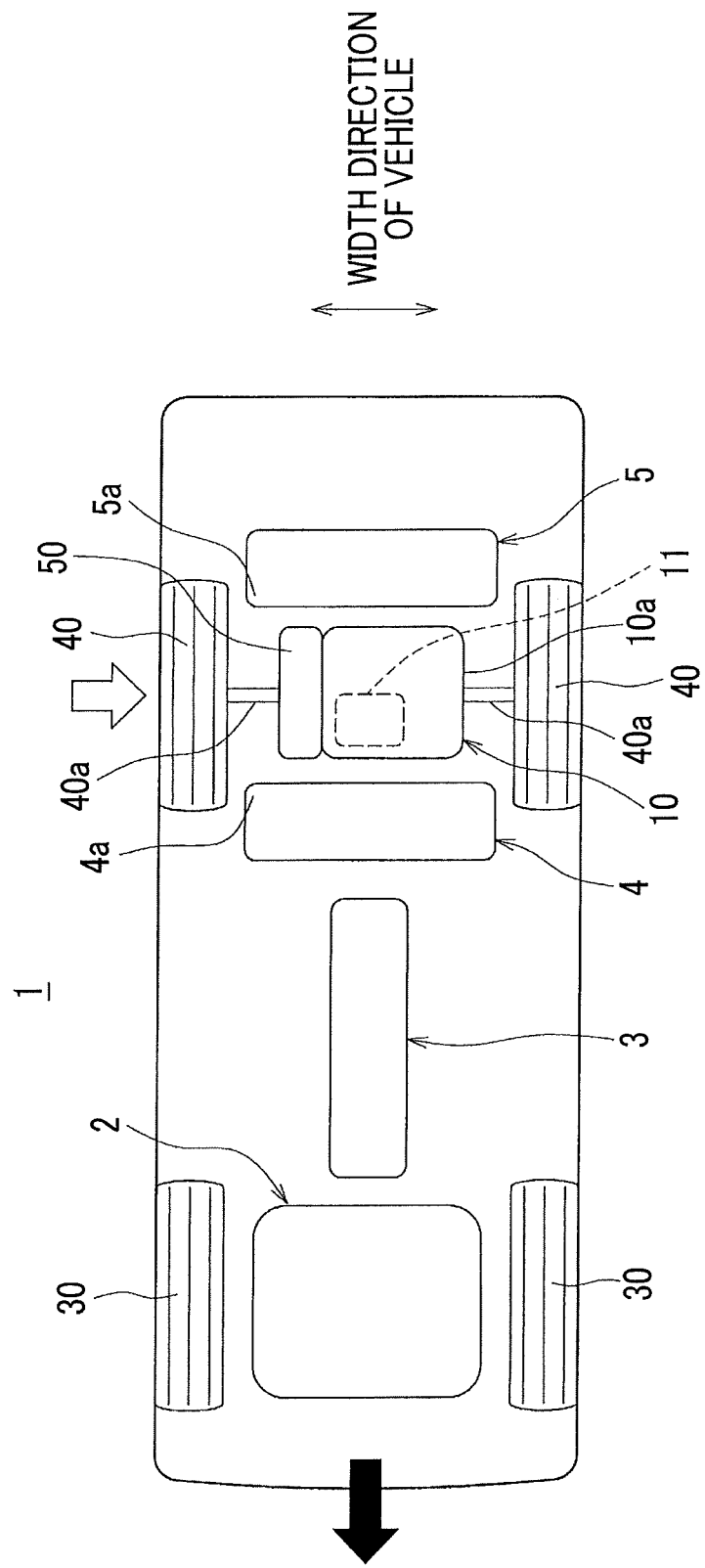
FIG. 1 is a diagram schematically illustrating a schematic configuration of a fuel cell vehicle according to an embodiment.

FIG. 1 is a diagram schematically illustrating a schematic configuration of a fuel cell vehicle 1 according to the present embodiment. The black arrow that is illustrated in FIG. 1 represents the front of the vehicle.

The fuel cell vehicle 1 according to the present embodiment is a rear wheel drive vehicle. As illustrated in FIG. 1, the fuel cell vehicle 1 is provided with a fuel cell stack 2 disposed in the front portion of the vehicle, a first fuel tank 3, a second fuel tank 4, a third fuel tank 5, a motor drive unit 10 disposed in the rear portion of the vehicle, front wheels 30 as driven wheels, and rear wheels 40 as drive wheels.

The fuel cell stack 2 is accommodated in an accommodating chamber that is disposed in the front portion of the vehicle and is partitioned from the vehicle cabin of the vehicle by a dash panel (not illustrated). The fuel cell stack 2 is an electric power generation device that generates electric energy for driving the fuel cell vehicle 1 by using a chemical reaction between oxygen in the air and hydrogen supplied from the first fuel tank 3, the second fuel tank 4, and the third fuel tank 5. The fuel cell stack 2 is formed by a plurality of cells being stacked. In each of the cells, an electrode assembly is sandwiched between separators with a hydrogen electrode catalyst and an oxygen electrode catalyst applied to both surfaces of a solid polymer electrolyte membrane, respectively.

The fuel cell stack 2 is electrically connected to a motor 11 (described later) via a DC-DC converter (not illustrated) and an inverter (not illustrated). As a result, the voltage from the fuel cell stack 2 is boosted by the DC-DC converter, and then the direct current from the DC-DC converter is converted to an alternating current by the inverter and supplied to the motor 11. The fuel cell stack 2 is an example of the "fuel cell" according to the aspect.

Each of the first fuel tank 3, the second fuel tank 4, and the third fuel tank 5 has a substantially columnar external shape. Each of the first fuel tank 3, the second fuel tank 4, and the third fuel tank 5 has a structure in which, for example, a reinforcing layer made of fiber reinforced plastics (FRP) is formed on the outer peripheral surface of a resinous liner. Each of the first fuel tank 3, the second fuel tank 4, and the third fuel tank 5 is firmly fixed to a lower surface side of a floor panel or the like by, for example, a band.

Figure 2:
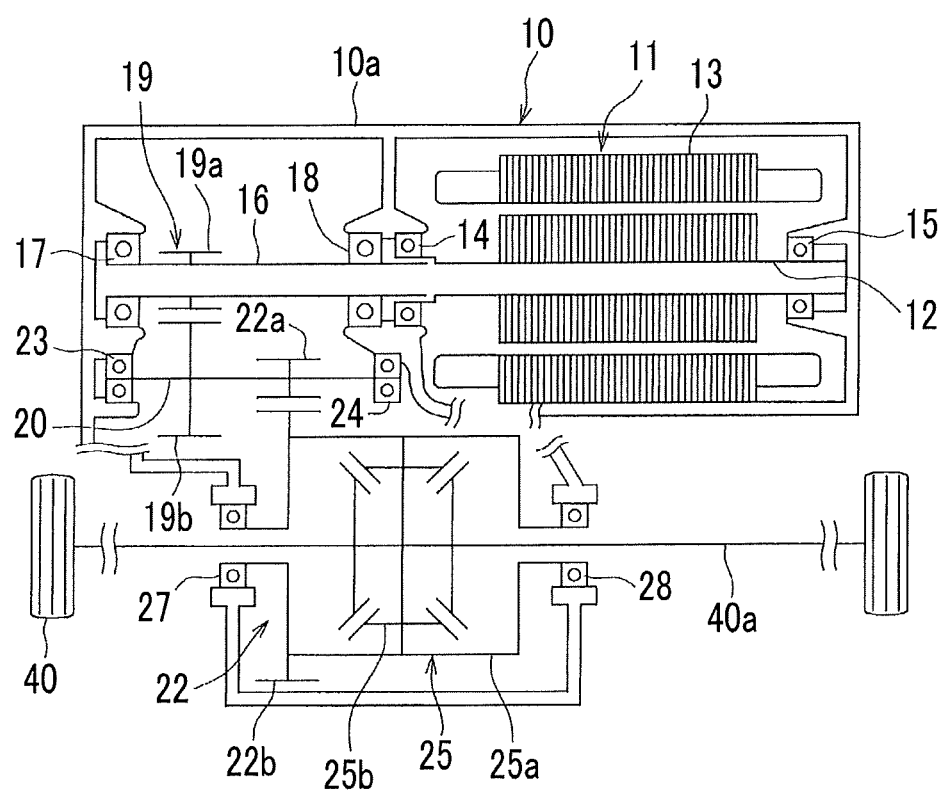
FIG. 2 is a skeleton diagram illustrating a schematic configuration of a motor drive unit.

The motor drive unit (the transaxle) 10 will be described below. As illustrated in FIG. 2, the motor drive unit 10 is provided with the motor (the electric motor) 11 as a drive source, a first reduction gear pair 19, a second reduction gear pair 22, and a differential gear device 25. The motor 11, the first reduction gear pair 19, the second reduction gear pair 22, and the differential gear device 25 are integrated in the motor drive unit 10 by being accommodated in a single case 10a. As illustrated in FIG. 1, the motor drive unit 10 has a high-voltage wiring portion 50 on one side of the motor drive unit 10 (one side in the width direction of the vehicle).

As illustrated in FIG. 1, the motor drive unit 10 is disposed over a pair of rear wheel axles 40a in the rear portion of the vehicle. The motor drive unit 10 is configured to transmit the drive force that is generated by the motor 11 to the rear wheel axles 40a via the first reduction gear pair 19, the second reduction gear pair 22, and the differential gear device 25.

The motor 11 has a rotor shaft 12 and a stator 13 fixed to the case 10a and surrounding the outer periphery of the rotor shaft 12. The rotor shaft 12 is rotatably supported by the case 10a via a pair of bearings 14, 15 mounted on both ends of the rotor shaft 12. An output shaft 16 connected to the rotor shaft 12 is rotatably supported by the case 10a via a pair of bearings 17, 18 mounted on both ends of the output shaft 16 and is capable of rotating integrally with the rotor shaft 12.

A small-diameter counter drive gear 19a and a large-diameter counter driven gear 19b constitute the first reduction gear pair 19. The counter drive gear 19a is disposed in one end portion of the output shaft 16 (the end portion on the side opposite to the motor 11). The counter driven gear 19b is disposed in a first end portion of a countershaft 20 parallel to the output shaft 16 (the end portion on the side opposite to the motor 11) and meshes with the counter drive gear 19a. The countershaft 20 is rotatably supported by the case 10a via a pair of bearings 23, 24 mounted on both ends of the countershaft 20.

A small-diameter final drive gear 22a and a large-diameter final driven gear 22b constitute the second reduction gear pair 22. The final drive gear 22a is disposed in a second end portion of the countershaft 20 (the end portion on the motor 11 side). The final driven gear 22b is integrally fixed to an outer peripheral portion of a differential case 25a and meshes with the final drive gear 22a. The differential case 25a and the final driven gear 22b integrally fixed to the differential case 25a are rotatably supported by the case 10a via a pair of bearings 27, 28 mounted in both axial end portions of the differential case 25a.

The differential gear device 25 is provided with the differential case 25a and a so-called bevel gear-type differential mechanism 25b accommodated in the differential case 25a. The differential gear device 25 is configured to transmit a drive force to the rear wheel axles 40a while allowing a rotation speed difference.

The first reduction gear pair 19, the second reduction gear pair 22, and the differential gear device 25 are examples of the "mechanism transmitting a drive force of the motor to a vehicle wheel axle" according to the aspect.

In the fuel cell vehicle 1 that is configured as described above, the fuel cell stack 2 generates electric power by the hydrogen being supplied from the first fuel tank 3, the second fuel tank 4, and the third fuel tank 5, the motor 11 is driven by the electric energy from the fuel cell stack 2, and the drive force that is generated by the motor 11 is transmitted to the differential gear device 25 via the first reduction gear pair 19 and the second reduction gear pair 22 and transmitted from the differential gear device 25 to the rear wheels 40 via the rear wheel axles 40a.

Disposition of Fuel Tanks

The disposition of the fuel tanks will be described below.

In order to increase the cruising distance (the maximum traveling distance per refueling or the like) of a fuel cell vehicle, the fuel cell vehicle needs to carry more fuel. However, an effective utilization of the space of the vehicle is hindered when a relatively large fuel tank is mounted in the vehicle. In the fuel cell vehicle 1 according to the present embodiment, the three relatively small fuel tanks (the first fuel tank 3, the second fuel tank 4, and the third fuel tank 5) are mounted in three different places in this regard.

Specifically, the first fuel tank 3 is disposed in the middle portion of the fuel cell vehicle 1 such that the longitudinal direction of the first fuel tank 3 corresponds to the front-rear direction of the vehicle as illustrated in FIG. 1. The second fuel tank 4 is disposed in front of the motor drive unit 10 such that the longitudinal direction of the second fuel tank 4 corresponds to the width direction of the vehicle and the third fuel tank 5 is disposed behind the motor drive unit 10 such that the longitudinal direction of the third fuel tank 5 corresponds to the width direction of the vehicle. In other words, the second fuel tank 4 is disposed in front of the motor drive unit 10 and the third fuel tank 5 is disposed behind the motor drive unit 10 such that the longitudinal direction of the second fuel tank 4 and the longitudinal direction of the third fuel tank 5 correspond to the width direction of the vehicle.

In the present embodiment, the second fuel tank 4 is disposed such that its end portion 4a is outside the high-voltage wiring portion 50 in the width direction of the vehicle and overlaps the rear wheel 40 on one vehicle-width-direction side in the front-rear direction of the vehicle. The end portion 4a is the longitudinal end portion of the second fuel tank 4 that is on the side on which the high-voltage wiring portion 50 is positioned (a side in the width direction of the vehicle). Likewise, the third fuel tank 5 is disposed such that its end portion 5a is outside the high-voltage wiring portion 50 in the width direction of the vehicle and overlaps the same rear wheel 40 in the front-rear direction of the vehicle. The end portion 5a is the longitudinal end portion of the third fuel tank 5 that is on the side on which the high-voltage wiring portion 50 is positioned (a side in the width direction of the vehicle).

The second fuel tank 4 and the third fuel tank 5 are examples of the "tanks configured to store a fuel gas to be supplied to the fuel cell" according to the aspect. Hereinafter, the second fuel tank 4 and the third fuel tank 5 will be referred to as the fuel tanks 4, 5.

Effects

In the fuel cell vehicle 1 according to the present embodiment, the second fuel tank 4 is disposed in front of the motor drive unit 10 and the third fuel tank 5 is disposed behind the motor drive unit 10 such that the longitudinal direction of the second fuel tank 4 and the longitudinal direction of the third fuel tank 5 correspond to the width direction of the vehicle as described above and the fuel tanks 4, 5 are disposed such that the longitudinal end portions 4a, 5a on the side on which the high-voltage wiring portion 50 is positioned are outside the high-voltage wiring portion 50 in the width direction of the vehicle and overlap the same rear wheel 40 in the front-rear direction of the vehicle as described above. By this configuration being adopted, the high-voltage wiring portion 50 can be protected with a higher level of reliability from a side collision.

In other words, even when the rear wheel 40 that is on the side on which the high-voltage wiring portion 50 is positioned is pushed into the motor drive unit 10 during a side collision of the fuel cell vehicle 1 (a collision in the direction that is indicated by the outlined arrow in FIG. 1), the rear wheel 40 hits the fuel tanks 4, 5 first, and thus the impact of the collision can be received by the fuel tanks 4, 5 first. As a result, the high-voltage wiring portion 50 can be protected with a higher level of reliability from the side collision and damage to the high-voltage wiring portion 50 can be avoided.

The rear wheel 40 is provided with a wheel connected to the rear wheel axle 40a and a tire mounted on the outer periphery of the wheel. When each of the second fuel tank 4 and the third fuel tank 5 is disposed such that it overlaps the wheel of the rear wheel 40 on the side in the front-rear direction of the vehicle, the wheel of the rear wheel 40 hits the fuel tanks 4, 5 first during the side collision. By the wheel of the rear wheel 40 being received by the fuel tanks 4, 5 as described above, the high-voltage wiring portion 50 can be protected with a higher level of reliability.

Each of the second fuel tank 4 and the third fuel tank 5 may also be disposed such that it overlaps the tire (mounted on the outer periphery of the wheel) of the rear wheel 40 on the side in the front-rear direction of the vehicle.

Other Embodiments

The embodiment disclosed herein is merely an example and does not constitute a basis for limited interpretation. Accordingly, the technical scope is to be defined based on the description of the claims without being interpreted based solely on the embodiment described above. The technical scope includes every alteration that has a meaning and is within a range equivalent to the claims.

For example, although an example in which a rear wheel drive fuel cell vehicle has been described in the embodiment above, the technical scope is not limited thereto and can also be applied to a front wheel drive fuel cell vehicle in which a motor drive unit is disposed in the front portion of the fuel cell vehicle and the front wheels of the fuel cell vehicle are driven by the motor drive unit.

In this case, fuel tanks are disposed in front of and behind the motor drive unit disposed in the front portion of the fuel cell vehicle such that the longitudinal direction of each of the fuel tanks corresponds to the width direction of the vehicle and the longitudinal end portion of each of the tanks that is on the side on which a high-voltage wiring portion is positioned is outside the high-voltage wiring portion in the width direction of the vehicle and overlaps the front wheel (more preferably, the wheel of the front wheel) on the side in the front-rear direction of the vehicle.

The technical scope can also be applied to a four wheel drive fuel cell vehicle that is capable of driving both front and rear wheels.

The technical scope can be used for a fuel cell vehicle that is provided with a motor drive unit in which a motor driven by the electric power that is generated by a fuel cell being used and a mechanism transmitting the drive force of the motor to a vehicle wheel axle are accommodated in a case and that has a high-voltage wiring portion on one side of the motor drive unit.

What is claim is:

1. A fuel cell vehicle, comprising:
   a motor drive unit including a motor driven by electric power generated by a fuel cell;
   a differential that transmits a drive force of the motor to a vehicle wheel axle, the vehicle wheel axle extending in a width direction of the fuel cell vehicle;
   a tire-wheel assembly connected to one end of the vehicle wheel axle;
   a case accommodating the motor and the differential, the motor drive unit being over the vehicle wheel axle;
   a high-voltage wiring portion on one side of the motor drive unit; and
   tanks configured to store a fuel gas to be supplied to the fuel cell, the tanks being respectively in front of and behind the motor drive unit such that a longitudinal direction of each of the tanks corresponds to the width direction of the fuel cell vehicle,
   wherein respective end portions of the tanks on a side on which the high-voltage wiring portion is positioned are outside the high-voltage wiring portion in the width direction of the vehicle, and the respective end portions of the tanks overlap the tire-wheel assembly in a front-rear direction of the fuel cell vehicle.

2. The fuel cell vehicle according to claim 1, wherein:
   the tire-wheel assembly includes a wheel and a tire mounted on an outer periphery of the wheel; and
   the tanks overlap the wheel on the side on which the high-voltage wiring portion is positioned in the front-rear direction of the vehicle.

* * * * *